United States Patent [19]

Klose et al.

[11] 4,246,286
[45] Jan. 20, 1981

[54] CHEWING GUMS OF IMPROVED SWEETNESS RETENTION

[75] Inventors: Robert E. Klose, West Nyack; Bernard J. Bahoshy, Mahopac; Ragnar E. Sjonvall, East Chester; James A. Yeransian, Pearl River, all of N.Y.

[73] Assignee: General Foods Corporation, White Plains, N.Y.

[21] Appl. No.: 29,183

[22] Filed: Apr. 12, 1979

[51] Int. Cl.$^3$ ............................................. A23G 3/30
[52] U.S. Cl. .......................................... 426/3; 426/548
[58] Field of Search ................................ 426/3-6, 426/548

[56] References Cited

U.S. PATENT DOCUMENTS

| | | | |
|---|---|---|---|
| 3,943,258 | 3/1976 | Bahoshy et al. | 426/3 |
| 3,982,023 | 9/1976 | Bahoshy et al. | 426/3 |
| 4,009,292 | 2/1977 | Finucane | 426/548 |
| 4,036,992 | 7/1977 | Bahoshy et al. | 426/548 |
| 4,045,581 | 8/1977 | Mackay et al. | 426/3 |
| 4,064,274 | 12/1977 | Mackay et al. | 426/3 |
| 4,065,579 | 12/1977 | Mackay | 426/3 |
| 4,071,615 | 1/1978 | Barth | 426/548 |
| 4,139,639 | 2/1979 | Bahoshy et al. | 426/3 |
| 4,170,635 | 10/1979 | Barth | 426/548 |

OTHER PUBLICATIONS

Mazur, R. H. et al., *A New Sugar Substitute*, The American Soft Drink Jour. 1971, pp. 94-95.

*Primary Examiner*—Jeanette M. Hunter
*Attorney, Agent, or Firm*—Thomas R. Savoie; Daniel J. Donovan

[57] ABSTRACT

This invention relates to a sweetened chewing gum composition which contains L-aspartyl-L-phenylalanine ethyl ester (APM) in amounts up to 1.5% by weight of the total product. The improvement comprises a gum which has a pH of between 5.0 and 7.0 so that the degradation of APM to diketopiperazine is minimized and the storage stability of the gum is greatly increased.

9 Claims, No Drawings

CHEWING GUMS OF IMPROVED SWEETNESS RETENTION

TECHNICAL FIELD

Conventional chewing gum generally includes a substantially water insoluble, chewing gum base such as chicle or the like. Incorporated within this gum base may be fillers and plasticizers or softeners to improve the consistency and texture of the gum. Sweetening agents, such as sucrose, corn syrup and/or intensive sweeteners (e.g., sodium saccharin or calcium saccharin) for low-sugar or sugar-free chewing gum products and flavors are also included as part of the chewing gum. More recently L-aspartyl-L-phenylalanine methyl ester (APM), originally discloses in U.S. Pat. Nos. 3,492,131 and 3,642,491 as demonstrating desirable sweetening properties, has been shown to be useful in certain chewing gum products to produce longer-lasting sweetness and flavor. Commonly-assigned U.S. Pat. Nos. 3,943,258, 3,982,023 and 4,036,992 disclose unfixed APM for this purpose and commonly-assigned U.S. Pat. Nos. 4,122,195 and 4,139,639 disclose the use of encapsulated APM for this same purpose. All of the aforementioned patents are herein incorporated by reference).

Recently it was found that the poorly-soluble free acid form of saccharin also possesses the ability to extend the sweetness of chewing gum and that sweetness may be further extended by reducing the particle size of the acid saccharin sweetener before incorporating it into conventional chewing gum base systems (U.S. Pat. No. 4,045,581). It was later determined, however, that in gum products containing conventional gum bases, that is, bases containing calcium carbonate (chalk) as a filler and/or texturizing agent, the free acid form of saccharin tends to lose its extended sweetness property. It is believed that this loss is due to a reaction between the acid saccharin and the carbonate bulking agent which results in the formation of a readily soluble saccharin salt. To alleviate this problem the prior art discloses two alternative solutions.

One of these solutions, that of U.S. Pat. No. 4,064,274, is comparable to a prior practice of using a non-basic filler, such as magnesium silicate, in gum formulations where an acid flavorant, such as a food acid, is employed in the gum formulation and where the pH of gum is desired to be below 4.0 in order that an acid or sour (typically fruit-flavored) gum is obtained. The presence of a basic filler such as calcium carbonate would, of course, cause an interaction with the food acid component of the gum. U.S. Pat. No. 4,064,274 teaches use of pulverized crystals of acid saccharin in a "chalk-free chewing gum base", i.e. a base containing less than 5% by weight calcium carbonate, if any at all. The "chalk free" product demonstrates acid saccharin sweetness retention of up to about 60 minutes on chewing as compared to a virtual total loss of saccharin sweetness after about 5 minutes of chewing a chalk-containing product. This sweetness loss is apparently due to saccharin salt formation during the initial minutes of chewing the gum.

U.S. Pat. No. 4,065,579, issued Dec. 27, 1977, speaks to a chalk-containing gum base. Instead of omitting the calcium carbonate from the gum base, the acid saccharin sweetener and/or the calcium carbonate are encapsulated with an edible coating agent to protect the saccharin from reacting with the chalk. This patent indicates that uncoated chalk may be employed in chewing gums containing uncoated poorly water-soluble sweeteners such as L-aspartyl-L-phenylalanine methyl ester without APM sweetness loss.

DISCLOSURE OF THE INVENTION

It has been found that certain chewing gum products containing L-aspartyl-L-phenylalanine methyl ester, herein after referred to as APM, demonstrate an appreciable loss of sweetness when kept under conventional storage conditions.

Most significantly, it has been determined that the sweetness loss is due to the presence of a basic material—namely, calcium carbonate—in the gum. This effect is totally unexpected in view of U.S. Pat. No. 4,065,579 which teaches the combination of uncoated chalk with APM and coated saccharin.

Accordingly, it is the principal object of this invention to provide a storage-stable APM chewing gum product without the need for fixation or encapsulation of the APM or reduction of the particle size of this sweetener.

In accordance with the present invention, the above-described difficulty is overcome by providing an APM-containing chewing gum product, a water extract of which will have a pH of between 5.0 and 7.0. Typically the gum products of this invention will contain no calcium carbonate and be substantially free of strongly basic constituents. The products of this invention will not be suitable for the addition of sour fruit flavors which are used in low pH food systems. Among the flavors which are compatible with a 5.0 to 7.0 pH gum are mint, tutti-fruity, clove, etc.

Gum bases suitable for use in the chewing gum products of this invention will be free of the normally-used calcium carbonate filler. These bases may be formulated by the substitution of non-basic fillers such as magnesium silicate or by the use of high levels of other ingredients, such as the wax component, present in the gum base with no added filler.

The gum base may be a chewable, substantially water insoluble base such as chicle and substitutes thereof, guttakay, sorva, jelutong, synthetic polymers such as polyvinyl acetate, synthetic resins, rubbers, and the like and mixtures of these materials. The amount of gum base employed may vary widely depending on the type base used and other ingredients making up the final gum product and other like factors. Generally, gum base will be used at a level from 15 to 40% by weight of the final gum composition, preferably from about 20 to about 30%. Plasticizers or softeners such as lanolin, propylene glycol, glycerol, lecithin and the like as well as mixtures thereof may optionally be incorporated within the gum base to achieve a desired texture and consistency. Specific gum base ingredients will be treated in greater detail in the ensuing disclosure regarding the gum base preparation.

Generally, the flavors employed in chewing gums may be the essential oils or synthetic flavors or mixtures of these. Flavors such as wintergreen, spearmint, peppermint, birch, anise and the like may be used satisfactorily. The amount of flavoring material is normally a matter of preference, but may be subject to the consideration of such factors as type of flavor used, type of base used and the like. Generally, flavoring materials account for about 0.5% to about 1.5% weight of the total gum composition.

The remaining major portion of the gum composition comprises sweeteners. The chewing gum products of the present invention contemplate both the "sugarless" and sugar-containing variety. The term "sugar" is intended to include not only sucrose but also other sugar-like sweeteners normally employed in chewing gums such as dextrose, glucose (corn syrup) and the like as well as mixtures thereof. In either instance, however, the invention contemplates the use of APM as at least one of the sweetening agents present which may or may not be employed in combination with readily soluble intensive sweetening agents such as saccharin salts, cyclamate salts, as well as combinations of the same. In a sugarless gum product containing APM as the sole intensive sweetening agent, APM is present at a concentration up to about 1.5% by weight of the gum composition, preferably about 0.4% to about 1%. Where the product is to contain other intensive sweeteners, for example, sodium saccharin, APM is usually present at a lower concentration range of about 0.1% to about 1.5% by weight of the gum composition with a range of about 0.3% to about 0.5% preferred. In such a case, the other intensive sweetener will be present at a range of about 0.05% to about 0.15% by weight of the gum composition with a saccharin concentration of about 0.075% to about 0.125% preferred. The use of other sparingly or slowly soluble intensive sweeteners, such as acid saccharin and acid cyclamate, in combination with APM is not within the scope of this invention.

Typically, when intensive or synthetic sweeteners are employed in a gum product, sugar alcohols such as sorbitol, mannitol, and xylitol are used as bulking agents. These materials which provide some level of sweetness to the gum will normally be present in the amount of at least 30% by weight of the gum composition. Sorbitol is generally used at a concentration range of about 45% to about 70% by weight of the gum composition with a concentration range of about 55% to about 65% being preferred. Mannitol is normally employed at a concentration range of from about 2.0% to about 20% by weight of the gum composition with a 5% to 12% range being preferred. A conventional range for xylitol would be from 10 to 70% by weight.

Typically when sugar is used as a sweetener in the gum, it is employed in amounts of at least 35% by weight. When sugar is used as the only readily soluble sweetener levels 65% to 85% by weight will be employed.

Applicants have now found that the presence of basic components, such as calcium carbonate, in the gum formulation adversely affects the stability of APM such that during prolonged storage diketopiperazine (DKP), a non-sweet, break-down product of APM is formed. This results in partial and eventually almost total loss in the amount of sweetness contributed to the product by APM. Whether this is due to an actual interaction of the basic ingredient with APM has not presently been determined; however, a direct correlation between APM loss and the pH of a water extract of the gum has been noted. Specifically, if the pH of the gum extract is above 7.0 a fairly rapid loss of APM is noted. Thus, the APM-containing gum must be at a pH of at or below 7.0 in order that acceptable stability standards and consequent sweetness be maintained.

As noted previously, it was also determined that a conventional calcium carbonate filler may be replaced by magnesium silicate (talc). In terms of APM stability only, omission of the calcium carbonate without replacement by talc is preferred; however, the presence of talc confers textural benefits to the product, i.e. it acts both as a bulking agent and texturizer. Thus, inclusion of talc or other non-basic filler, when viewing the product as a whole, is preferred. Talc, when employed, is preferably present at a concentration of about 10% to about 50% by weight of the gum base and preferably about 15% to about 25% with about 20% considered optimum.

In order to determine the reason for the APM loss on storage, several gum base samples were prepared, all of which were evaluated in chewing gum sticks containing 0.6% by weight of APM. The first sample constituted the control which contained all the standard ingredients (see Table I) of a conventional gum base (including calcium carbonate) at the standard proportions. The second sample was comprised of the same ingredients as the control with the elimination of calcium carbonate. The third sample was the same as the control with the exception that talc was used as a replacement for the calcium carbonate. The remaining seven (7) samples all contained calcium carbonate at the same proportion as the control but one (1) different gum base ingredient was deleted from each sample.

The ten gum base samples were all formulated into chewing gum compositions having the following formulation:

| Ingredient | % by Weight |
|---|---|
| Gum Base | 27 |
| Sorbitol (crystalline) | 47.4 |
| 70% Sorbitol Solution | 17.3 |
| Mannitol | 6.1 |
| Flavor | 1.3 |
| Lecithin | 0.3 |
| APM | 0.6 |

A water extract of each of the chewing gums was obtained and the pH of this extract was recorded. Individual sticks of the gums were made and then each stick was wrapped in a conventional foil/paper gum wrapper. Sticks were packed in a paper/poly/foil/poly pouch, five to a pouch and heat sealed. Gum sticks were approximately 7.4 cm×1.9 cm×0.165 cm in size and approximately 2.8 grams in weight. Each gum sample was then divided into two (2) equal portions. One (1) portion of each sample was stored at 20° C./50% RH for 3 weeks and a second portion was stored at 38° C./30% RH for the same period of time. At the expiration of the three (3) week period, the percent APM loss was determined. The following results were obtained:

TABLE I

| GUM BASE COMPOSITION (GRAMS/BATCH) | | | |
|---|---|---|---|
| | Control Base With CaCO$_3$ | CaCO$_3$ Omitted No Filler | CaCO$_3$ Replaced With Talc |
| Elastomer | 230 | 230 | 230 |
| Hydrogenated Ester Gum | 400 | 400 | 400 |
| Wax | 730 | 730 | 730 |
| Calcium Carbonate | 398 | — | — |
| Talc | — | — | 388 |
| Polyvinyl Acetate | 200 | 200 | 200 |
| Glyceryl Monostearate | 40 | 40 | 40 |
| BHT | 2 | 2 | 2 |
| | 2000g | 1602g | 1990g |
| Extract pH Before Storage | 7.4 | 6.1 | 6.4 |

TABLE I-continued

| | GUM BASE COMPOSITION (GRAMS/BATCH) | | |
|---|---|---|---|
| | Control Base With CaCO₃ | CaCO₃ Omitted No Filler | CaCO₃ Replaced With Talc |
| APM Loss 20° C./50% RH | 32% | 2% | 9% |
| APM Loss 38° C./30% RH | 67% | 9% | 12% |

The remaining test samples from which single different conventional gum base ingredients were deleted exhibited pH readings of from 7.5 to 7.9. The APM loss determinations ranged from 31% to 46% at 20° C. storage temperature and from 62% to 90% at 38° C.

Thus APM chewing gums prepared without calcium carbonate (chalk) in the gum base exhibited up to 16 times greater APM retention than the corresponding chalk-containing product, at the 20° C. storage conditions. Replacement of the chalk with talc demonstrated a degree of APM stability 5 times greater than the chalk-containing control at the 38° C. storage conditions.

The preparation of the chewing products of this invention may be performed by methods well-known in the art. In general, the gum base is prepared by heating and blending various ingredients, such as natural gums, synthetic elastomers, modified natural resins, synthetic resins, waxes, plasticizers, etc. Typical examples of the ingredients found in a chewing gum base are masticatory substances of synthetic origin such as styrene-butadiene copolymer, butyl rubber, petroleum wax, polyisobutylene, polyvinyl acetate as well as masticatory substances of natural origin such as rubber latex solids, e.g. chicle, crown gum, nispero and the like. The elastomer or masticatory substance(s) will be employed in an amount ranging from about 5% to about 20%, preferably 8% to about 14% with 11% to 13% by weight of the gum base composition considered optimum.

In addition, the gum base will preferably contain a solvent for the elastomer which should have minimal tackifying properties and will preferably comprise hydrogenated ester gum, that is, glycerol ester of hydrogenated resin and/or dimerized ester gum. However, other solvents may be employed such as pentaerythritol ester gum, polymerized ester gum and ester gum. The solvent will be employed in an amount ranging from about 10% to about 40%, preferably from about 15% to about 35%, with about 20% to about 25% by weight of the gum base considered optimum.

The gum base may also include a hydrophilic-type detackifier, such as polyvinyl acetate, which will sorb saliva and become slippery and is incompatible with the elastomer and solvent for the elastomer. The detackifier will usually be employed in an amount ranging from about 10% to about 30% by weight of the gum base.

The gum base may also include certain waxes which serve primarily as lubricants. The lubricant waxes will usually be employed in an amount ranging from about 20% to about 50% by weight of the gum base. Examples of appropriate waxes are paraffin wax, candalilla wax, carnuba wax and microcrystalline waxes, with microcrystalline waxes being preferred.

The gum base may also include a softening agent and lubricant combination which may comprise one or more hydrogenated vegetable or animal fats. Such softening agent and/or lubricant may be employed in amounts well-known in the art.

The gum base will also include an emulsifier to impart hydrophilic properties to the gum base. The emulsifier will be employed in amounts ranging from about 1% to about 5% by weight of the gum base, preferably about 1.5% to about 3% with about 2% considered optimum. Examples of such emulsifiers includes phosphatides such as lecithin, fatty acids such as stearic and palmetic acids, and mono- and diglycerides of these fatty acids and mixtures thereof, with glyceryl monostearate being preferred.

In addition, the gum base may include colorants such as approved food colors, antioxidants such as BHA, BHT and propyl gallate each up to about 0.1% of the gum base and fillers.

The gum base is prepared by heating and/or blending the various ingredients mentioned above in a manner well-known in the art.

The chewing gum of the invention may also include flavoring, such as non-acid or mint flavoring in an amount ranging from about 0.5% to about 1.5% by weight, and preferably about 0.7% to about 1.3% by weight of the final gum product. The flavoring may comprise oils derived from plants, leaves, flowers, etc., as well as the following essential oils: peppermint oil, spearmint oil, mixtures of peppermint oil and spearmint oil, clove oil, bay oil, anise oil, eucalyptus oil, thyme oil, cedar leaf oil, oil of nutmeg, oil of sage, oil of bitter almonds, methylsalicylate (oil of wintergreen) and the like. Various synthetic flavors may also be incorporated in the chewing gum of the invention with or without conventional preservatives.

A method for forming an APM-containing sugarless gum having improved shelf-stability is to add the gum base (which may or may not contain talc) to a preheated mixer (about 60°–80° C.) and mix for a short period of time, e.g. about 15 minutes. Alternately, the gum base may be preheated before adding to the mixer. A portion of a bulk sweetener such as sorbitol and/or mannitol, preferably a blend of sorbitol and mannitol, or the like is then added to the gum base and mixed therewith for about 15 minutes. A sorbitol syrup is then added to the previously identified mixture and the entire composition mixed for another short period, e.g. 5 minutes. The remainder of the sorbitol/mannitol blend is then added in addition to APM and any other sweeteners, if any, along with any flavoring, coloring etc. The heat source is removed from the mixer and the gum product ingredients then mixed until a homogenous composition is obtained, usually about 10 minutes. The resulting mix is then formed into sticks or tablets of chewing gum employing conventional techniques.

The following Examples are intended to be illustrative of the preferred embodiments of the present invention and are not to be construed as limiting in any sense.

EXAMPLE I

Preparation of the gum bases for Examples II to V is accomplished as follows:

A portion of the elastomers are premixed with a portion of the wax, hydrogenated ester gum and talc (if any). The remaining elastomers, polyvinyl acetate, and approximately one-third of the hydrogenated ester gum are added to this composition over a period of approximately 20 minutes while mixing in a sigma-type mixer at 220°–260° C. and mixed for an additional ten minutes. The remaining hydrogenated ester gum and talc (if any)

are added over a period of 20 minutes, then the microcrystalline waxes are added over a period of thirty-five minutes, the glyceryl monostearate and antioxidant (BHT) added, and mixing continued for ten minutes before stopping mixing and removing the finished gum base.

The following table sets out the various ingredients of the particular gum bases of Examples II, III and IV, and a typical control base containing a conventional amount of calcium carbonate:

| Gum Base Composition In Percent By Weight | | | |
|---|---|---|---|
| | Control | Examples II,III,IV | Example V |
| Elastomer | 11.50 | 14.36 | 11.56 |
| Hydrogenated Ester Gum | 20.00 | 24.98 | 20.10 |
| Wax | 36.50 | 45.56 | 36.68 |
| Talc | 0.00 | 0.00 | 19.50 |
| Calcium Carbonate | 19.90 | 0.00 | 0.00 |
| Polyvinyl Acetate | 10.00 | 12.48 | 10.05 |
| Glyceryl Monostearate | 2.00 | 2.50 | 2.01 |
| Antioxidant | .10 | .12 | .10 |
| | 100.00% | 100.00% | 100.00% |

EXAMPLE II

A sugarless shelf-stable, long-lasting flavored chewing gum is prepared from the following ingredients:

| Ingredient | Percent by Weight of Chewing Gum |
|---|---|
| Calcium Carbonate-Free Gum Base (refer to Ex. I) | 27.00 |
| Sorbitol (crystalline) | 47.40 |
| Sorbo syrup (70% sorbitol in water) | 17.30 |
| Mannitol | 6.10 |
| Flavor | 1.30 |
| Lecithin | 0.30 |
| APM | 0.60 |

The mixer was preheated to 65.5° C. with a mixture of steam and water. The gum base alone was mixed for about 5 minutes to soften the base in order to obtain proper mixing with the ensuing ingredients. About ⅔ of the sorbitol and mannitol were added to the base and blended therewith for about 15 minutes. The sorbo syrup was then added and the ingredients mixed until uniform (about 5 minutes). The remainder of the sorbitol and mannitol were added in addition to the intensive sweeteners (APM and sodium saccharin), flavor and lecithin, the steam turned off, and the entire composition mixed until uniform (about 10 minutes). The gum was removed from the mixer and passed through sheeting rolls at approximately 38° C. to a thickness of 1.73 mm—1.90 mm. The resultant sheets were tempered at 20° C./45% RH for about 24 hours, scored into sticks and packaged.

When compared to a chalk-containing but otherwise identical gum product control, the control exhibited 67% AMP loss after 3 weeks storage at 38° C./30% RH as compared to a 9% loss in the test sample formulated above.

EXAMPLE III

A shelf-stable long-lasting flavored sugarless chewing gum is prepared from the following ingredients:

| Ingredient | Percent by Weight of Chewing Gum |
|---|---|
| Calcium Carbonate-Free Gum Base (refer to Ex. I) | 27.00 |
| Sorbitol | 47.60 |
| Sorbo Syrup (70% Sorbitol in water) | 17.30 |
| Mannitol | 6.10 |
| Flavor | 1.30 |
| Lecithin | 0.30 |
| Sodium Saccharin | 0.10 |
| APM | 0.30 |

The same procedure for the preparation of the gum was employed as in Example II.

EXAMPLE IV

A shelf-stable long-lasting peppermint flavor sugar-APM chewing gum is prepared from the following ingredients:

| Ingredient | Percent by Weight of Chewing Gum |
|---|---|
| Calcium Carbonate-Free Gum Base (refer to Ex. I) | 24.00 |
| Sucrose 6x | 59.40 |
| Corn Syrup, 46° Be' | 14.20 |
| Peppermint Oil | 1.30 |
| Glycerol | 0.75 |
| APM | 0.35 |

The gum Base was softened in a steam-jacketed sigma blade mixer 65.5° C. for about 15 minutes. A portion of the corn syrup was added and mixed with the other ingredients for about 15 minutes. The remainder of the corn syrup and all of the glycerol were then added to the mixture and the entire composition mixed for about 5 minutes. The APM, sucrose and peppermint oil were then added to the above-identified composition and mixing continued for about two (2) minutes. On completion of mixing, the gum was removed from the mixer and passed through sheeting rolls at approximately 38° C. to a thickness of 1.73 mm—1.90 mm. The resultant sheets of gum were then tempered at about 20° C./50% RH for 24 hours, scored into sheets and packaged.

EXAMPLE V

A sugarless, shelf-stable, long-lasting flavored chewing gum is prepared from the following ingredients using the procedure of Example IV.

| Ingredient | Percent by Weight of Chewing Gum |
|---|---|
| Talc-containing Gum Base (refer to Ex. I) | 27.00 |
| Sorbitol (crystalline) | 47.40 |
| Sorbo Syrup (70% sorbitol in water) | 17.30 |
| Mannitol | 6.10 |
| Flavor | 1.30 |
| Lecithin | 0.30 |
| APM | 0.60 |

When compared to the control gum which contained chalk in lieu of talc, the control exhibited a 67% APM loss after 3 weeks' storage at 38° C./30% RH as compared to a 12% loss in the test sample formulated above.

We claim:

1. A storage-stable chewing gum containing L-aspartyl-L-phenylalanine methyl ester in an amount of from 0.1% to 1.5% by weight of the gum, said gum having a pH of between 5.0 and 7.0 as measured by a water extract of the gum said pH being effective to minimize the formation of diketopiperazine and to maintain the sweetness of the L-aspartyl-L-phenylalanine methyl ester during prolonged storage, and wherein said gum is free of acid saccharin, acid cyclamate or sour fruit flavors.

2. The chewing gum composition of claim 1 wherein the gum is free of calcium carbonate.

3. The chewing gum composition of claim 1 wherein the gum contains a gum base in the amount of 15% to 40% by weight and wherein the base includes a magnesium silicate filler at a level of from 10% to 50% by weight.

4. The product of claim 1 or 3 wherein L-aspartyl-L-phenylalanine methyl ester is the sole intensive sweetener in said product.

5. The product of claim 1 or 3 wherein L-aspartyl-L-phenylalanine methyl ester is present in combination with a readily-soluble intensive sweetener.

6. The product of claim 5 wherein L-aspartyl-L-phenylalanine methyl ester is present at a concentration of about 0.3% to about 0.5% by weight of the gum product and the other intensive sweetener(s) is present at a concentration of about 0.05% to about 0.15% by weight of said product.

7. The product of claim 1 or 3 wherein said product is free of sugar.

8. The product of claim 1 or 3 wherein the product contains a sugar alcohol in the amount of at least 30% by weight.

9. The product of claim 1 or 3 wherein the product contains sugar in the amount of at least 30% by weight.

* * * * *